March 20, 1956
T. R. STONER
2,739,119
FLOW CONTROL VALVES
Filed Dec. 17, 1949
3 Sheets-Sheet 2
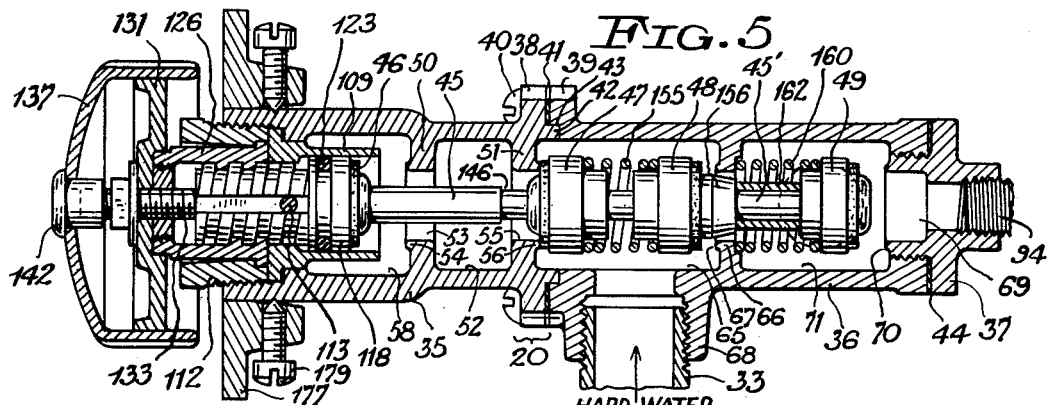
FIG. 5
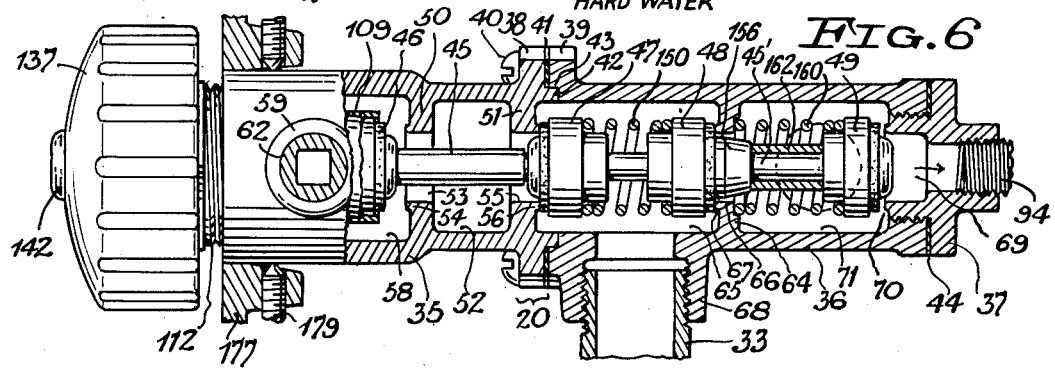
FIG. 6
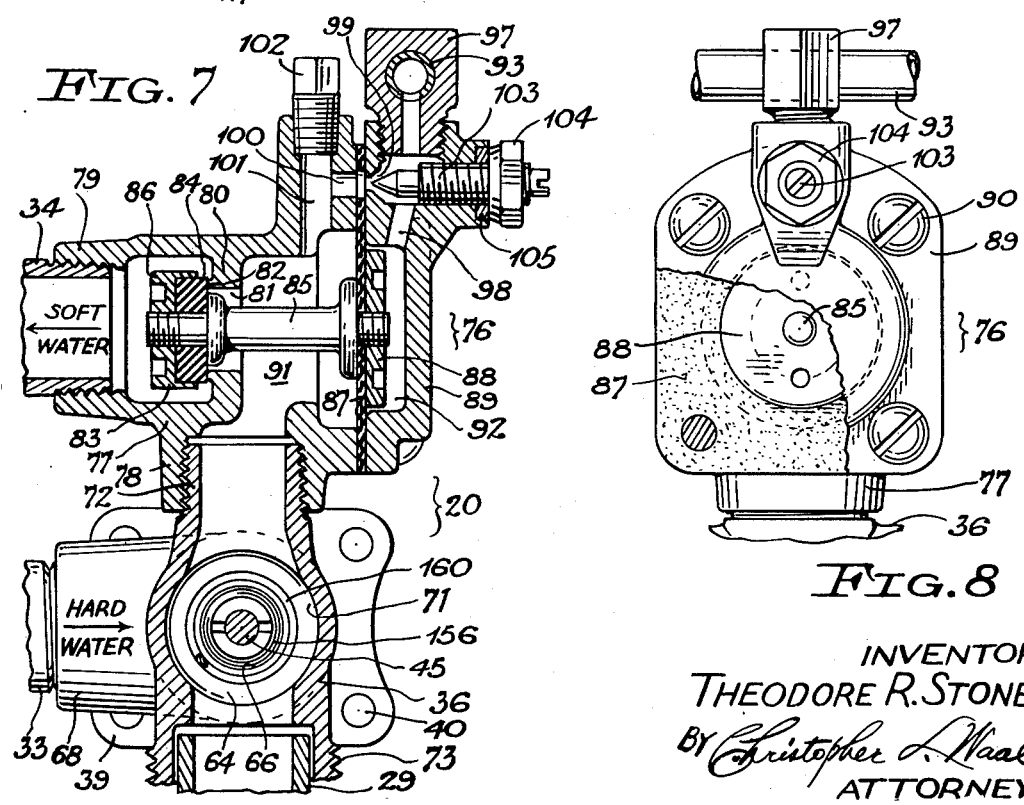
FIG. 7
FIG. 8
INVENTOR
THEODORE R. STONER
BY Christopher L. Naal
ATTORNEY

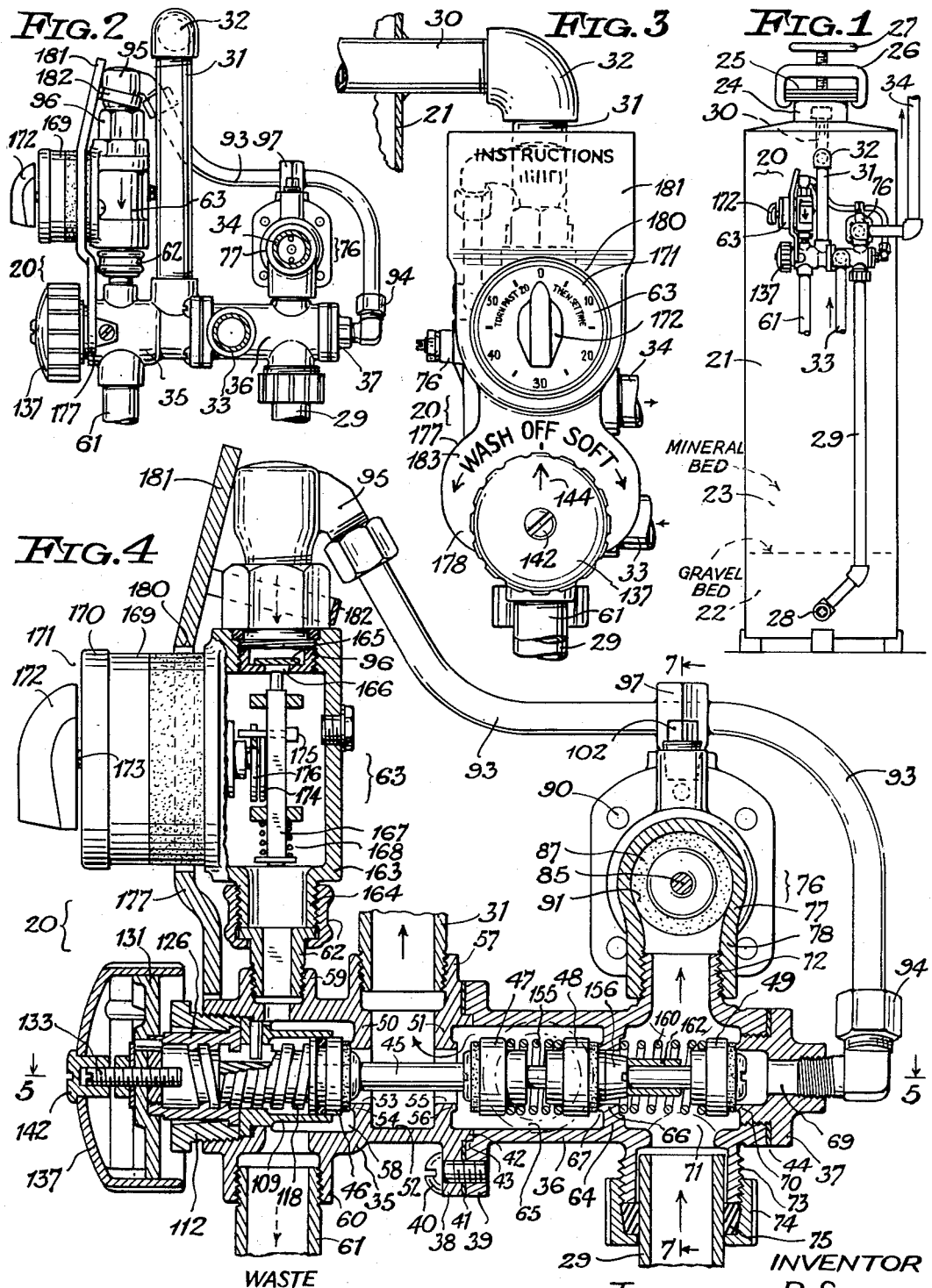

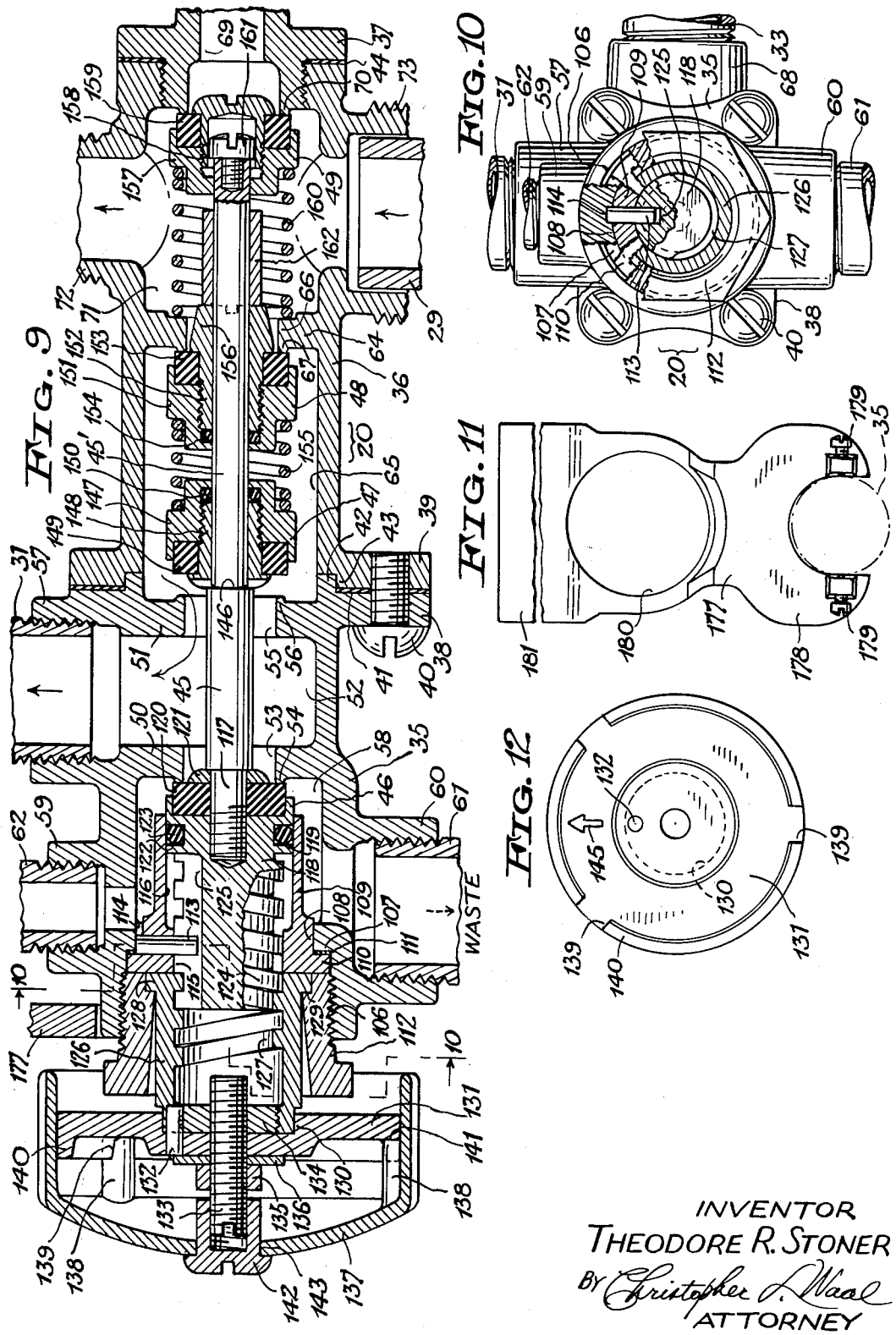
March 20, 1956     T. R. STONER     2,739,119
FLOW CONTROL VALVES
Filed Dec. 17, 1949     3 Sheets-Sheet 3
INVENTOR
THEODORE R. STONER
BY Christopher L. Waal
ATTORNEY United States Patent Office 2,739,119
Patented Mar. 20, 1956

2,739,119

FLOW CONTROL VALVES

Theodore R. Stoner, Milwaukee, Wis.

Application December 17, 1949, Serial No. 133,565

6 Claims. (Cl. 210—24)

The present invention relates to valves and more particularly to multiple-passage control valves for use with water-treating apparatus, such as softeners and filters, although capable of other uses.

An object of the invention is to provide an improved control valve adapted for use with water softening apparatus of the base exchange type, and which is so arranged as to facilitate maintenance and servicing of the apparatus.

Another object is to provide a water softener valve which will prevent flow of brine into the service pipe or house line during regeneration, and a more specific object is to provide a valve structure in which the same valve element serves this purpose and also forms a check valve to prevent reverse flow from the service pipe.

A further object is to provide a control valve adapted for use with a water-treating tank, such as a combined filter and softener, and arranged to permit downflow in the tank during softening and also during regeneration, and to effect upflow back-washing for cleaning the filter.

A still further object is to provide a control valve which is capable of inexpensive manufacture and assembly and which includes simple means for preventing leakage and for taking up valve wear.

The invention further consists in the several features hereinafter described and claimed.

In the accompanying drawings,

Fig. 1 is an elevation of a water softening and filtering tank installation including a control valve of the invention;

Fig. 2 is a side elevation of the control valve, piping parts being shown in section;

Fig. 3 is a front end view of the valve as it appears when connected to the tank, parts being broken away and parts being shown in section;

Fig. 4 is a longitudinal sectional elevation of the valve, showing the valve in position for operation in water softening;

Fig. 5 is a longitudinal sectional view of the valve taken generally on the line 5—5 of Fig. 4, showing the valve in tank flushing or back-washing position;

Fig. 6 is a sectional view generally similar to Fig. 5, but showing the valve in an intermediate stopping position to permit opening of the tank;

Fig. 7 is a sectional elevational view taken generally on the line 7—7 of Fig. 4;

Fig. 8 is a detail view of the diaphragm valve shown in Fig. 7, parts being broken away, and parts being shown in section;

Fig. 9 is an enlarged longitudinal sectional view of the valve in the same position as Fig. 4;

Fig. 10 is a transverse sectional view of the valve taken generally on the line 10—10 of Fig. 9;

Fig. 11 is a rear view of a front plate, and

Fig. 12 is a detail front view of a valve handle disk.

In the drawing, the numeral 20 designates generally a control valve constructed in accordance with the invention. The valve is adapted for use with a combined water softener and filter of the single-tank type, here shown to comprise an upright mineral tank 21 having the usual gravel bed 22 at its lower end supporting the usual mineral or zeolite bed 23, both of these beds having a filtering action on the water which normally flows downwardly in the tank. The tank has a flanged neck 24 at its upper end closed by a gasketed cover plate 25 which is detachably secured to the neck by a C-shaped clamp 26 and a clamping screw 27. In some instances the neck or upper portion of the tank may provide a head space above the water level. At its lower portion the tank is provided with a lateral outlet pipe 28 which extends in the gravel bed 22 and has its outer end connected to the valve 20 by an upwardly projecting pipe 29, as hereinafter described, the valve being placed near the upper end of the tank. At its upper end the tank has a screened inlet pipe 30 which projects laterally from the tank, preferably below the level of the tank neck. A downwardly projecting pipe 31 is connected to the inlet pipe 30 by an elbow 32, Fig. 3, and the lower end of the pipe 31 is connected to the valve 20 as hereinafter described. The valve is also connected as hereinafter described to a supply pipe 33 which conducts hard or raw water under pressure, and to a service pipe or house line 34 which conducts the softened water from the tank to the usual water heater, not shown, and also in some instances directly to a faucet, not shown. As hereinafter described, the water is softened during its downward flow in the tank, and the valve can be manipulated to effect flushing or back-washing of the filter beds in the tank in an upward direction, and to effect regeneration and rinsing by downward flow in the tank.

The valve 20 includes an elongated body or casing comprising a plurality of serially connected coaxial body members or sections 35, 36, and 37, the aligned axes of these members preferably being horizontal. The adjacent ends of the body members 35 and 36 have respective flanges 38 and 39 secured together by screws 40, and an annular gasket 41 is interposed between these flanges. The flanged end of the body member 35 further has an annular rib 42 which fits in an annular rabbet 43 in the flanged end of the body member 36 to align these body members. The body member 37 is screwed into the rear end of the body member 38 and against a gasket 44. The valve further includes a coaxial valve stem 45 extending longitudinally in the valve body and being axially reciprocable therein as hereinafter described. The valve stem carries thereon four axially spaced valve members, designated 46, 47, 48, and 49, and hereinafter specifically described, the first being rigidly connected to the stem and the other three being spring-pressed and having lost-motion connections with the stem, as hereinafter described. The valve body is provided with various chambers, passages and ports therein, hereinafter set forth, cooperating with the valve members 46 to 49 and with certain other valve elements hereinafter mentioned for controlling the flow of water and brine through the tank.

The front body member 35 has near its rear portion a pair of axially spaced webs or partition walls 50 and 51 forming a chamber 52 between them. The front partition wall 50 has a central port 53 surrounded by a forwardly facing valve seat 54 cooperating with the valve member 46 which forms a waste valve member. The partition wall 51 has a central port 55 surrounded by a rearwardly facing valve seat 56 cooperating with the valve member 47. The chamber 52 communicates with an upwardly projecting screw-threaded boss 57 formed on the body member 35 and connected to the lower end of the vertical section 31 of the tank inlet pipe 30. In front of the ported partition wall 50 the body member 35 has a waste or drain chamber 58 which communicates with upper and lower screw-threaded bosses 59 and 60 formed on this body member. A waste or drain pipe 61 is connected to the lower boss 60, and a coupling 62 connects the upper boss 59 with a normally closed clock-controlled drain valve device 63, hereinafter described, this valve device being open during the regeneration period to discharge the spent regenerating solution.

The body member 36 has a web or partition wall 64 spaced rearwardly from the partition wall 51 and forming therebetween a hard water supply chamber or inlet chamber 65. The partition wall 64 has a central port 66 surrounded by a forwardly facing valve seat 67 cooperating with the valve member 48. The inlet chamber 65 communicates with a laterally projecting screw-threaded boss 68 formed on the body member 36 and connected to the hard water supply pipe 33.

The rear body member or plug 37 has an axial port or passage 69 the inner end of which is surrounded by a forwardly facing valve seat 70 cooperating with the valve member 49. A chamber 71 is formed in the body member 36 between the ported partition wall 64 and the ported rear body member 37 and communicates with upper and lower screw-threaded nipples 72 and 73 formed on the body member 36. The lower nipple 73 is externally screw-threaded to receive a flanged nut 74 confining and compressing a rubber washer 75 to form a slip joint connection with the upper end of the pipe 29.

A check valve device or fitting 76, best seen in Fig. 7, includes a hollow body member or casing 77 with a downwardly projecting boss 78 which is screwed onto upper nipple 72 of the main valve body. The body member 77 has a lateral screw-threaded boss 79 to which the house pipe 34 is connected. A partition wall 80 is formed in the body member 77 at a region spaced inwardly from the boss 79, and is provided with an axial outlet port 81 surrounded by an outwardly facing valve seat 82. A check valve member 83 has a packing washer 84 of rubber or other suitable material engageable with the valve seat 82 and carried on an end of a spool-shaped valve stem or stud 85 which extends horizontally through the port 80, the packing washer being confined by a cup member 86 screwed onto the valve stem. The other end of the valve stem 85 is secured to and supported by the middle portion of a flexible diaphragm 87, such as of reinforced rubber, by means of a screw-threaded disk 88. The edge portion of the diaphragm is clamped between a flanged end of the body member 77 and a marginally flanged cover plate 89, the latter being secured to the body member by screws 90. The body member 77 has a water chamber 91 at the check valve side of the diaphragm in free communication with the outlet port 81 and with the chamber 71 of the valve body member 36. Another water chamber 92 is formed between the diaphragm and the cover plate 89.

A tube 93 has one end connected by an elbow 94 with the end body member 37 of the main valve body, and has its other end connected by an elbow 95 with the upper end of a valve cage 96 forming a part of the clock-controlled drain valve device 63. A laterally apertured intermediate portion of the tube 93 passes through a branch fitting 97 which is screwed into the upper part of the diaphragm valve cover member 89 to provide communication between the tube and the diaphragm chamber 92, the cover member having a passage 98 extending between the chamber 92 and the fitting 97. An enlarged portion of passage 98 has a small conical bleed port 99 opening at a face of the cover member 89 in register with a port 100 in the adjacent end face of the body member 77, the latter port opening from a passage 101 communicating with the diaphragm chamber 91. A screw plug 102 closes an outer end of the passage 101. A needle valve 103 is screwed into the cover member for adjustably obstructing the bleed port 99 and is locked in adjusted position by a lock nut 104 bearing against a soft metal sealing washer 105 countersunk in the cover member. The needle valve 103 serves to limit the rate of flow of the regenerating solution or salt rinsing water from the chamber 91 to the clock-controlled drain valve 63 during the regeneration period, and the differential pressure in the diaphragm valve device acts to hold the check valve 83 closed against tank pressure during this period, since the pressure in the diaphragm chamber 91 is then considerably greater than the pressure in the diaphragm chamber 92.

The front body member 35 of the main valve body has a forwardly opening screw-threaded bore 106, Fig. 9, coaxial with the valve stem 45 and terminating at its rear end at an annular shoulder 107. The inner edge of the shoulder 107 is defined by an axial bore 108 terminating at the front portion of the waste chamber 58. A guide sleeve 109 extends into the chamber 58 coaxially of the valve stem 45 and has an annular front flange 110 bearing against an annular gasket 111 on the annular shoulder 107, the sleeve being confined in place by a bushing 112 screwed into the bore 106. A radial pin 113 is pressed through the wall of the guide sleeve 109 near the flange 110 and has an outer end fitting in a groove 114 in the bore 108 to prevent rotation of the sleeve. The sleeve has a short bore 115 at its front end and a larger and longer bore 116 at its rear portion.

The front end of the valve stem 45 has a reduced end 117 screwed axially into a metal plunger or follower 118 which extends in the sleeve 109. The plunger has a cylindrical rear portion 119 which slidably fits in the bore 116 of the guide sleeve 109 and is cupped at its rear end to receive and confine a packing ring or washer 120 adapted to engage the waste valve seat 54, the packing washer being clamped between the cupped end of the plunger and a metal washer 121 on the stem. The rear portion of the plunger and packing washer 120 constitute the waste valve member 46. The cylindrical portion 119 of the plunger has an annular groove 122 receiving an O-ring 123 of neoprene or similar rubber-like material bearing against the walls of the sleeve bore 116 to form a water seal. The O-ring is not required to resist any substantial pressure as any water pressure in the waste chamber 58 is relatively low. The reduced front portion of the plunger is screw-threaded, preferably with a coarse square thread 124, and has a longitudinal slot 125 slidably receiving the inner end of the pin 113, thus preventing rotation of the plunger.

A cup-shaped tubular driver 126 has an internal screw thread 127 engaging the screw thread on the plunger 118, and has an outturned annular flange 128 at its rear end axially confined between the front face of the guide sleeve 109 and an annular shoulder 129 in the rear end of the threaded bushing 112. The driver is thus confined against axial shifting, but is rotatable to advance and retract the valve stem.

The outer end of the driver is reduced and fits in a central circular recess or depression 130 formed in a handle disk 131, the disk being keyed to the driver by a pin 132. A headless stop screw 133 is threaded centrally through the outer end wall 134 of the cup-shaped driver and passes through the disk 131. A lock nut 135 holds the screw in adjusted position and bears on a washer 136 which also confines the outer end of the key pin 132. A cup-shaped handle 137 fits over the disk 131 and has a plurality of axially extending ribs 138 on its inner wall with ends fitting in notches 139 in a marginal flange 140 of the disk, the rib ends presenting shoulders 141 engaging the front face of the disk. The notches are unequally spaced so as to insure proper assembly of the handle. A headed screw plug 142 fits in a central opening 143 in the crowned front wall of the handle and is threaded onto the front end of the stop screw 133, thus locking the handle to the driver disk 131. The handle has a radial index arrow 144 which is adapted for alignment with an index arrow 145 or other mark on the driver disk, thus facilitating assembly of the handle.

The valve stem 45 has a reduced cylindrical rear portion 45′ on which are slidably mounted the valve members 47, 48, and 49. A rearwardly facing annular shoulder 146 is formed on the valve stem at the front end of the reduced portion.

The valve member 47 comprises a forwardly cupped collar 147 into the front end of which a headed bushing 148 is screwed for confining a packing washer 149 adapted to bear against the rearwardly facing valve seat 56, the head of the bushing being transversely slotted. The bushing 148 is slidable on the valve stem and its front end is adapted to abut against the annular shoulder 146 of the valve stem, so as to hold the valve member 47 off its seat when the valve stem is in its normal rearmost position. An O-ring 150 is confined between the rear end of the bushing and the reduced rear portion of the collar and engages the valve stem to form a water seal.

The valve member 48 comprises a rearwardly cupped collar 151 into the rear end of which a headed bushing 152 is screwed for confining a packing washer 153 adapted to bear against the forwardly facing valve seat 67, the bushing being slidable on the valve stem. An O-ring 154 is confined between the front end of the bushing 152 and the reduced front portion of the associated collar. The slidably mounted valve members 47 and 48 are urged apart by an interposed coiled spring 155 seated against annularly shouldered portions of their collars. The bushing 152 is provided with a rearwardly converging frusto-conical head 156 which has a transversely slotted rear end and which fits loosely in the circular port 66 to restrict the flow of water during the flushing or back-washing period. The rate of flow can be adjusted by varying the position of the stop screw 133 against which the front end of the valve stem plunger 118 is adapted to abut, thus changing the width of the annular orifice between the frusto-conical head 156 and the surrounding wall of the port 66.

The slidable valve member 49 comprises a rearwardly cupped collar 157 into the rear end of which a cup-shaped headed bushing 158 is screwed for confining a packing washer 159 adapted to engage the forwardly facing valve seat 70, the bushing being slidable on the valve stem, and the bushing head being transversely slotted. The valve member 49 is urged rearwardly by a coiled spring 160 interposed between the collar 157 and the valve body partition wall 64. A headed screw 161 is axially engaged in the free end of the valve stem 45 and forms a stop to limit the spring-urged travel of the valve member 49 when the latter is spaced from the valve seat 70. A pusher sleeve 162 is slidably mounted on the valve stem between the bushing head 156 of the valve member 48 and the front end of the collar 157 of the valve member 49. As seen in Fig. 5, the sleeve 162 is engagable by the collar 157 of the valve member 49 when the latter is displaced forwardly, thus serving to unseat the valve 48 after a predetermined forward travel of the valve stem.

The clock-controlled valve device 63 per se is of conventional construction and is here shown to comprise a housing 163, Fig. 4, having an outlet nipple 164 at its lower end screwed into the coupling 62. The drain valve device 63 further includes the valve cage 96 which is screwed into the upper end of the housing and guides therein a valve disk 165 closing a central bottom port 166. A vertical lifter bar 167 is slidably but non-rotatably mounted in the housing 163 for axial displacement and has an upper end adapted to unseat the valve disk 165 when the bar is displaced upwardly against the action of a return spring 168. A clock mechanism 169 is mounted on the housing 163 and includes a cylindrical casing 170 with a front dial 171 and with a time-setting knob 172 which is carried on a shaft 173. The inner end of the shaft carries the usual cam disk 174 cooperating with a cross pin 175 on the lifter bar 167 for raising the bar and thus opening the valve disk 165. At the end of the timing period the cross pin drops into the usual notched disk 176 of the timing mechanism to permit closing of the valve disk 165.

A front plate 177 has a forked lower end 178 straddling the front body member 35 and secured thereto by set screws 179, Figs. 5 and 11, at opposite sides. The front plate has a circular opening 180 through which the clock casing 170 projects, and has a sloping top portion 181 secured to a stationary part of the valve device 63, as by a metal strap 182. The top portion 181 of the plate is adapted to receive suitable indicia, such as instruction data. The lower portion of the plate carries suitable indicia 183, such as the words "Wash" and "Soft" and associated arrows pointing in opposite directions, to indicate the proper direction for rotating the valve handle. The indicia may also include a central "Off" legend. In the normal or water-softening position of the control valve, the handle 137 is turned clockwise as far as it will go. In the flushing or back-washing position of the valve, the handle is turned counter-clockwise as far as it will go. In an intermediate or stopping position of the valve, the water supply is shut off and the arrow 144 on the valve handle points in a general upward direction, as to the "Off" legend on the front plate.

The packing washers or disks for the valve members 46 to 49 are formed of suitable material such as a rubber composition or the like. If desired, the packing washer 120 for the waste valve member 46 may be formed of harder material than the other packing washers.

In the normal or "Soft" position of the control valve, shown in Figs. 4 and 9, the waste port 53 is closed by the valve member 46, the ports 66 and 69 are closed by the spring-loaded valve members 48 and 49, respectively, and the valve member 47 is spaced rearwardly from the port 55, permitting access of hard or raw water under pressure from the supply pipe 33 through the valve chamber 65, the open port 55, the valve chamber 52, and upwardly through the pipes 31 and 30 to the upper end of the softener tank 21. When a valve in the house line 34 is opened, water flows downwardly through the softener tank, and softened water flows upwardly from the bottom of the tank through the pipe 29, upwardly through the valve chambers 71 and 91, and thence outwardly past the check valve 83 to the house line. The downward flow in the tank minimizes disturbance of the mineral and gravel beds.

When the softener requires regeneration, the control valve handle 137 is first turned counter-clockwise as far as it will go to place the valve in the flushing or back-washing position shown in Fig. 5. This manipulation of the handle rotates the screw-threaded driver 126 and draws the valve stem 45 forwardly until the front end of the screw-threaded plunger 115 abuts against the stop screw 133. The guide sleeve 109 slidably supports the valve stem plunger and maintains the alignment of the elongated valve stem. In a typical valve, the total rotation of the handle may range from 1½ to 2 turns, depending on the setting of the stop screw 133. In the forward travel of the valve stem the waste valve member 46 opens first, then the valve member 49 opens, then the valve member 47 closes, and finally the valve member 48 opens. The incoming raw or hard water now flows into the valve chamber 65, rearwardly past the open valve member 48 and the flow restricter 156 to the valve chamber 71, downwardly through the pipe 29 to the bottom of the tank, upwardly in the tank through the gravel bed 22 and mineral bed 23, downwardly from the upper end of the tank through the pipes 30 and 31 to the valve chamber 52, forwardly through the open waste port 53 into the waste chamber 58, and downwardly and outwardly through the waste pipe 61. The tank is thus flushed or back-washed in an upward direction, and floatage passes out through the waste pipe. The rate of flushing flow is limited by the flow restricter 156 to avoid loss of the zeolite and filtering material, and can be preadjusted by means of the stop screw 133. During the flushing period the clock-controlled drain valve device remains closed, and the check valve 83 prevents reverse flow of water from the house line.

After a suitable flushing or back-washing period, which is generally short, usually not more than about five minutes, the valve handle is turned clockwise for one turn or less until the index arrow 144 on the handle points upwardly, placing the valve in the "Off" position shown in Fig. 6. This rotation of the handle moves the valve stem 45 rearwardly until the flushing valve member 48 closes, the spring-pressed valve member 47 remaining closed and the waste valve member 46 and valve member 49 remaining open. The "Off" position of the control valve is not critical, as the valve members 47 and 48 will both remain closed during about 180° displacement of the valve handle, thus compensating for considerable wear on the several packing washers. With the control valve in "Off" position the clock-controlled drain valve device 63 is opened, and water then drains from the tank through the upflow pipe 29 and open valve port 69 until the water level reaches the elbow fitting 95 at the upper end of the drain valve. Both valve members 47 and 48 being closed, the softener tank is shut off from the water supply, so that the tank cover 25 can be removed to permit introduction of a measured charge of salt into the upper end of the tank. The check valve 83 prevents water in the house line from flowing back to the tank. The tank cover is then replaced and the clock-controlled drain valve 63 is then if not previously set to close after a suitable regenerating and rinsing period, for example about 45 minutes, this period depending on the size of the tank. The valve handle is then turned clockwise as far as it will go (about ¾ to 1 turn) to its "Soft" position, restoring the softener valve to the position shown in Figs. 4 and 9 except for the open condition of the timer valve. The serviceman or attendant is then free to leave, as his work is completed. With the clock-controlled drain valve 63 in open position, there is a slight flow of hard water downwardly in the tank, the rate of flow being preadjusted by the needle valve member 103. During regeneration, salt water flows through the control valve and tank in the same path as the soft water in normal operation, except that the salt water does not pass out the house line but instead flows from the diaphragm chamber 91 past the needle valve member 103, upwardly in the branch fitting 97, through the tube 93 to the upper end of the drain valve 63, thence downwardly through the coupling 62 and the waste chamber 58, and out through the waste pipe 61. The water pressure in the diaphragm chamber 91 is somewhat higher than that in the chamber 92 on the other side of the diaphragm, thus exerting a differential pressure on the diaphragm for holding the check valve 83 closed. This prevents flow of salt water into the water heater and house line if a valve in the house line should be inadvertently opened during the regeneration period. After regeneration is completed and the timer valve closes, the water pressure on opposite sides of the diaphragm will become equalized through the needle valve port 99 so as to release the tension on the stem of the check valve 83, and the system is then in normal condition to provide softened water to the house line, the check valve 83 being free to open.

The pusher sleeve 162 on the valve stem 45 is shown to be a separate member but if desired it can be made integral with either the bushing 152 or with the collar 157. In the case of a softener tank with a suitable head space it is not necessary to effect partial draining of the tank before admitting the salt charge. With a tank of this type the valve member 49 and its associated outlet would not be required, although the shoulder screw 161 would still retain its function of unseating the valve 48.

In the normal position of the control valve, the waste valve member 46 is positively closed by rotating the valve handle in the proper direction, the seating of this valve member being unaffected by the presence of the valve members 47, 48, and 49. The valve member 49 is held against its seat by spring pressure and also by the water pressure in the valve chamber 71. In the "Off" position of the valve, the valve members 47 and 48 are held against their respective seats by spring pressure and also by the water pressure in the inlet chamber 65. While each of the valve members 47 and 48 has a sealing member engaging the valve stem, any leakage which may occur when either or both of these valve members are closed would be insignificant and would be confined to the interior of the valve.

The clock-controlled drain valve device 63 automatically closes to place the control valve in normal condition at the end of an extended regenerating period, thus facilitating the servicing of the softener. However, in some instances the drain valve device may be manually closed, the control valve as a whole being otherwise unchanged.

What I claim as new and desire to secure by Letters Patent is:

1. In a valve arrangement for a water softener of the regenerating type having a softener tank containing water under pressure during normal softening operation and also during regeneration, a valve body adapted for connection to a soft water outlet of the water softener tank, said body having a chamber adapted to receive softened water under pressure from the tank and provided with an outlet port for connection with a service conduit, a movable check valve member for closing said outlet port to prevent reverse flow in said conduit and being normally free to open in the direction of forward flow, said body having a second chamber, a flexible diaphragm separating said chambers and operatively connected to said check valve member for moving said check valve member to closed position, there being a restricted passage between said chambers for normally equalizing the liquid pressure in said chambers, a discharge conduit communicating with said second chamber, and a drain valve for said discharge conduit, said drain valve when open reducing the water pressure in said second chamber whereby said check valve member is held closed by differential pressure on said diaphragm, said restricted passage determining a slow rate of flow of regenerating solution therethrough when said drain valve is open.

2. In a valve arrangement for the regenerating type having a softener tank containing water under pressure during normal softening operation and also during regeneration, a valve body adapted for connection to the water softener tank, said body having a chamber adapted to receive softened water under pressure from the tank and provided with an outlet port adapted for connection to a service conduit, a movable check valve member for closing said port to prevent reverse flow in said conduit and being normally free to open in the direction of forward flow, a cover member secured to said body, a flexible diaphragm interposed between said body and cover member, a stem connecting said diaphragm and check valve member for moving said check valve member to closed position, said diaphragm at one side forming a wall of said chamber, there being a second water chamber on the other side of said diaphragm and a restricted passage connecting said chambers for normally equalizing the liquid pressure in said chambers, a discharge conduit communicating with said second chamber, and a drain valve for said discharge conduit, said drain valve when open reducing the water pressure in said second chamber whereby said check valve member is held closed by differential pressure on said diaphragm, and said restricted passage determining a slow rate of flow of regenerating solution therethrough when said drain valve is open.

3. In a valve arrangement for a water softener of the regenerating type having a softener tank with an outlet conduit for connection to a service conduit, and in which the outlet conduit receives softened water under pressure from the tank during the softening operation and receives spent regenerant under pressure from the tank during the regenerating operation, a movable valve member for opening and closing communication between the tank outlet conduit and service conduit, a regenerant discharge conduit extending from said tank outlet conduit and having a flow restriction limiting the rate of regenerant flow from said tank outlet conduit during regeneration, a drain valve in said discharge conduit downstream from said flow restriction and movable to open and closed positions, said drain valve being closed during the softening operation and open during the regenerating operation, and liquid pressure actuating means responsive to differential pressure on opposite sides of said flow restriction when said drain valve is open and including a liquid-pressure-displaceable element operatively connected to said movable valve member for holding said valve member closed against tank pressure during the regeneration period to thereby prevent flow of regenerant from said tank outlet conduit to said service conduit.

4. In a valve arrangement for a water softener of the regenerating type having a softener tank containing water under pressure during normal softening operation and also during regeneration, a valve body having a chamber for connection to an outlet of the tank to receive softened water under pressure from the tank during the softening operation and to receive spent regenerant under pressure from the tank during the regenerating operation, said chamber having an outlet port for connection to a service conduit, a movable valve member for opening and closing said outlet port, said body having a second chamber, a flexible diaphragm separating said chambers and operatively connected to said valve member for moving said valve member to closed position, there being a restricted passage between said chambers for normally equalizing the liquid pressure in said chambers, a regenerant discharge conduit communicating with said second chamber, and a drain valve in said discharge conduit movable to open and closed positions, said drain valve being closed during the softening operation and open during the regenerating operation, said drain valve when open reducing the liquid pressure in said second chamber whereby said valve member is closed by differential pressure on said diaphragm, said restricted passage determining a slow rate of flow of regenerant therethrough when the drain valve is open.

5. In a valve arrangement for a water softener of the regenerating type having a softener tank with a raw water inlet conduit and a soft water outlet conduit and in which tank the normal softening flow and regenerating flow are both under pressure and in the same direction, a control valve having a ported valve body for connection to said tank conduits and provided with a raw water inlet and with an outlet chamber including an outlet port for connection to a service conduit, said control valve having a normal water softening position directing flow of water from the tank outlet conduit to said outlet chamber, a movable valve member for opening and closing said outlet port, a regenerant discharge conduit extending from said outlet chamber and having a flow restriction limiting the rate of regenerant flow from said chamber during regeneration, a drain valve in said discharge conduit downstream from said flow restriction and movable to open and closed positions, said drain valve being closed during the softening operation and open during the regenerating operation, and liquid pressure actuating means including a movable diaphragm carried by said valve body and responsive to differential pressure on opposite sides of said flow restriction when said drain valve is open, said diaphragm being operatively connected to said movable valve member for holding said valve member closed against tank pressure during the regeneration period to thereby prevent flow of regenerant from said valve body chamber to said service conduit.

6. In a valve arrangement for a water softener of the regenerating type having a filter-forming softener tank in which softening flow and regenerating flow are downward and back-washing flow is upward and in which the tank contains water under pressure during normal softening operation and also during regeneration, a control valve having a ported valve body and movable valve means in said body shiftable to a normal softening position and a flow-reversing back-washing position and a shut-off position, said valve body having a supply chamber and an outlet chamber for respective connections to the upper and lower portions of the tank and having a raw water inlet selectively communicating with said chambers, said outlet chamber having an outlet port for connection to a service conduit, a movable valve member for opening and closing said outlet port, said body having a pressure chamber, a movable diaphragm separating said pressure chamber and outlet chamber and operatively connected to said movable valve member for moving said valve member to closed position, there being a restricted passage between said pressure chamber and outlet chamber for normally equalizing the liquid pressure in said chambers, a discharge conduit communicating with said pressure chamber, and a drain valve for said discharge conduit movable to open and closed positions, said drain valve when open reducing the water pressure in said pressure chamber whereby said valve member is held closed by differential pressure on said diaphragm, said restricted passage determining a slow rate of regenerant flow therethrough when said drain valve is open.

References Cited in the file of this patent

UNITED STATES PATENTS

| | | |
|---|---|---|
| 1,630,741 | Griffiths | May 31, 1927 |
| 1,789,314 | Lindsay | Jan. 20, 1931 |
| 1,949,044 | Dotterweich | Feb. 27, 1934 |
| 1,962,663 | McGill | June 12, 1934 |
| 2,028,933 | Johnson | Jan. 28, 1936 |
| 2,061,797 | Eisenhauer | Nov. 24, 1936 |
| 2,067,808 | Zimmerman et al. | Jan. 12, 1937 |
| 2,106,094 | Griffey et al. | Jan. 18, 1938 |
| 2,188,487 | Sharp | Jan. 30, 1940 |
| 2,192,451 | Moore | Mar. 5, 1940 |
| 2,225,838 | Miller | Dec. 24, 1940 |
| 2,247,964 | Reynolds | July 1, 1941 |
| 2,492,859 | Griswold | Dec. 27, 1949 |
| 2,504,816 | De Ville | Apr. 18, 1950 |
| 2,596,915 | Pick | May 13, 1952 |